United States Patent [19]
Barnett et al.

[11] 4,128,524
[45] Dec. 5, 1978

[54] COMPOSITES OF METAL-MODIFIED UREA-MELAMINE-FORMALDEHYDE RESINS AND FILLERS

[75] Inventors: David L. Barnett, Washington Boro; Peter A. Christie; Lewis W. Eckert, both of Lancaster, all of Pa.

[73] Assignee: Armstrong Cork Company, Lancaster, Pa.

[21] Appl. No.: 712,293

[22] Filed: Aug. 6, 1976

[51] Int. Cl.² .......................... C08K 3/22; C08K 3/36
[52] U.S. Cl. .......................... 260/39 R; 106/DIG. 2; 260/395 B
[58] Field of Search ............... 106/DIG. 2; 260/39 R, 260/395 B, 39 SB

[56] References Cited
U.S. PATENT DOCUMENTS

| | | | |
|---|---|---|---|
| 2,634,208 | 4/1953 | Miscall et al. | 106/DIG. 2 |
| 2,884,380 | 4/1959 | Cook et al. | 106/DIG. 2 |
| 2,956,893 | 10/1960 | Houston et al. | 106/67 |
| 3,015,626 | 1/1962 | Kingsbury | 252/62 |
| 3,623,938 | 11/1971 | Jenkins | 161/159 |
| 3,787,368 | 1/1974 | Lander | 260/54 X |
| 3,878,142 | 4/1975 | Tisza | 260/39 R |

*Primary Examiner*—S. M. Person
*Attorney, Agent, or Firm*—Sughrue, Rothwell, Mion, Zinn and Macpeak

[57] ABSTRACT

A composite molded product comprising a pressure molded and cured product of
 (a) expanded perlite particles; and
 (b) a metal-modified urea-melamine-formaldehyde resin; optionally containing an inorganic or organic fiber with or without a filler, and a method for producing the same.

22 Claims, No Drawings

COMPOSITES OF METAL-MODIFIED UREA-MELAMINE-FORMALDEHYDE RESINS AND FILLERS

DESCRIPTION OF THE PRIOR ART

1. Field of the Invention

This invention relates to a composite molded product comprising inorganic particles and a resin binder and more specifically relates to a pressure molded and cured composite product containing expanded perlite particles and a metal-modified urea-melamine-formaldehyde resin. The composite molded product is useful as building members such as fire barriers, thermally insulating wall panels, and especially as ceiling boards. This invention also relates to a method of producing the above-described composite molded product.

2. Description of the Prior Art

Composite molded materials suitable for use in the building and construction industry as ceiling boards, wall panels, etc., are well known in the art and are widely used today. In general, these materials comprise solid materials such as inorganic or organic particles or fibers, bound together with a binder material. Representative examples of such composite molded materials are disclosed in U.S. Pat. Nos. 2,583,192; 3,132,956; 3,095,347; 3,522,067; and 3,886,076. These references teach the use of binders such as sodium silicate, clay and starch with perlite. However, none of these references provide a satisfactory thermosetting binder.

Characteristics which are desirable for these composite molded materials to possess include structural rigidity and strength, thermal insulaton properties, acoustical insulation properties, surfaces which are easy to decorate or emboss, lack of flammability and particularly a low level of evolution of noxious gases upon heating or burning, etc. Additionally, dimensional stability under varying conditions of humidity and temperature as well as a low density are desirable properties. A large amount of research has been done in the past and continues to be done on various compositions and products useful as building materials and emphasis recently has been on the production of non-flammable or fire-resistant materials and materials which evolve increasingly smaller amounts of toxic gases in the event of fire.

SUMMARY OF THE INVENTION

An object of this invention is to provide a composite molded product having good thermal insulation and acoustical properties useful as a building material.

Another object of this invention is to provide a composite molded product having good structural strength.

A further object of this invention is to provide a composite molded product useful as a building material having good compression resistance, as well as dimensional stability and resistance to sagging under humid conditions.

A further object of this invention is a non-burning composite having a low density.

A still further object of this invention is a composite having itself a good texture as well as an adaptability to other textures by the use of appropriate molds.

The objects of this invention are achieved with the composite molded product of this invention which comprises a pressure molded and cured product of (a) about 80 to 60% by weight of expanded perlite particles; and (b) about 20 to 40% by weight of a metal-modified urea-melamine-formaldehyde resin.

The objects of this invention are also achieved in a second embodiment of this invention which comprises a reinforced composite molded product comprising the pressure molded and cured product of (a) about 79 to 40% by weight of expanded perlite particles;
(b) about 20 to 40% by weight of a metal-modified urea-melamine-formaldehyde resin; and
(c) about 1 to 20% by weight of an organic or inorganic fibrous material.

Further, the objects of this invention are also achieved in a third embodiment which comprises a reinforced composite molded product comprising the pressure molded and cured product of (a) about 68 to 35% by weight of expanded perlite particles;
(b) about 17 to 36% by weight of a metal-modified urea-melamine-formaldehyde resin;
(c) about 1 to 18% by weight of an organic or inorganic fibrous material; and
(d) about 14 to 10% by weight of a filler, preferably clay.

The objects of this invention are further achieved in accordance with a process for making the composite molded product described above which comprises (i) uniformly blending expanded perlite particles, an aqueous solution of a metal-modified urea-melamine-formaldehyde resin, and, optionally, a fibrous material with or without a filler, in the proportions by weight described above to produce a composite mixture;

(ii) molding the composite mixture in a mold under a pressure of about 125 to 200 lb/in$^2$ (8.8 to 14.1 kg/cm$^2$) to produce a molding; and (iii) curing the molding at a temperature of about 65° to 95° C. to produce the composite molded product.

DETAILED DESCRIPTION OF THE INVENTION

As described above, the composite molded product of this invention comprises two, or three, or four essential components of expanded perlite particles and a metal-modified urea-melamine-formaldehyde resin and, optionally, a fibrous reinforcing material with or without a filler.

The first component of the composite molded product of this invention comprises expanded perlite particles. Replacement of perlite by vermiculite was found to produce less satisfactory results, e.g., in terms of strength. As used herein, the term "expanded perlite particles" is intended to cover perlite ore which has been exfoliated by heating. Suitable expanded perlite particles which can be employed in this invention include those in which natural perlite volcanic ore containing about 2 to 5% of excess water has been expanded by heating at about 1600 to 1850° F. to produce light weight, cellular glass fragments. Suitable expanded perlite particles which can be used are those perlite particles which have a particle size ranging from about 0.15 to 4 mm, preferably from about 0.3 to 1.0 mm. Particle sizes lower than these ranges tend to raise the density of the final board product while higher particle sizes lead to poor compaction, lower strength of the product, increased friability and lowering of the ability to obtain fine textural details in the final board product. The desired particle sizes correspond to a range of bulk density of from about 2.5 to 3.5 pounds per cubic foot. Perlite is a well-known material and in general is not only commercially available as the natural ore but also is commercially available already expanded. Suitable sources of the expanded perlite particles which can be employed in the composite molded product of this invention are the Johns-Manville and Grefco companies. The size ranges of the expanded perlite can be controlled by control of the "popping" conditions, i.e., control of the expansion process, and by screening procedures of the expanded perlite particles themselves.

The second essential component of the composite molded product of this invention comprises the metal-modified urea-melamine-formaldehyde resin. In general, the metal-modified urea-melamine-formaldehyde resin can be described as the condensation product of the reaction product of a group IVB metal halide such a titanium tetrachloride with urea and the subsequent condensation of this product with a urea-melamine-formaldehyde material. Thus, resins such as those described in U.S. Pat. No. 3,787,368 are usable as the binders in the present invention. Although titanium-modified resins are preferred, in view of a short cure period and low cost, zirconium- and hafnium-modified resins can also be utilized. Additionally, materials having two labile hydrogens other than urea can be used in the place of urea as described in U.S. Pat. No. 3,787,368. Further, aldehydes other than formaldehyde can be used in the place of formaldehyde in the process and product of the present invention. In general, this condensation product used as a binder in the composite molded product of the invention is employed in the form of an aqueous solution having a concentration of at least about 54%, preferably about 54 to 56% by weight. If the concentration of all materials in the binder exclusive of water are below about 54% by weight, a poorly consolidated resin is obtained. However, any concentration above about 54% is usable in the present invention with concentrations above 56% being substantially unnecessary and undesirable from a cost standpoint.

The binder resin having a concentration of about 54 to 56% by weight in water can be produced from the reaction product of a group IVB metal halide with urea having a concentration of about 68 to 70% by weight in water with a urea-melamine-formaldehyde material having a concentration of about 51% by weight in water. However, essentially all of the resins produced by the processes described in U.S. Pat. No. 3,787,368 can be used as the binders in the present invention.

More specifically, in preparing the metal-modified urea-melamine-formaldehyde resin used as the second component of this invention, and taking titanium as representative of the metal modifier, the resin component can be prepared by mixing, for example, titanium tetrachloride and urea in water followed by the addition of sodium bicarbonate, e.g., as described in U.S. Pat. No. 3,787,368, mixing this with a urea-melamine-formaldehyde condensation product to produce the resin component.

Suitable examples of metal-modified urea-melamine-formaldehydes which can be employed in this invention are disclosed in U.S. Pat. No. 3,787,368, the disclosure of which is hereby incorporated by reference herein.

The resulting metal-modified resin is a thermosetting system which undergoes cure rapidly under mild conditions without the need for additional external catalysts to give a low-shrinkage cross linked network which is compatible with a variety of inorganic as well as organic fibers. The cured resin has a unique and desirable microporous structure.

The resin composition above as a second component of the composite molded product of this invention is generally employed in the amount of about 20 to 40% by weight, preferably 20 to 25% by weight, to the weight of the expanded perlite particles. Lower resin levels lead to a more poorly bound and weak composite product, while higher levels can result in undesirably dense products.

In the second and third embodiments of the composite molded product of this invention, a fibrous material can be present as a third component for the purposes of reinforcement. More specifically, the fibrous component can be an inorganic fiber or an organic fiber and suitable specific examples thereof include fiberglass, newsprint fiber, wood fiber, wollastonite, polyvinyl alcohol fibers and chopped polyester fibers, and the like. Where the composite molded product of this invention contains this additional third component as a reinforcing material, a suitable proportion of the three components which can be employed in this embodiment comprise a ratio by weight of expanded perlite particles: fiber reinforcement: metal-modified urea-mealamine-formaldehyde of about 79:1:20 to about 40:20:40. In the case of fiberglass, higher levels can result in poor distribution in the composite board while with the use of wood fibers, higher levels can result in increased flammability.

Further, the fiber reinforcement material can be in the form of chopped strands. The wood fibers can be mechanically or chemically defibered wood, preferably having fibers lengths of about one-eighth to one-half inch. The fiberglass can preferably be in the form of strands up to about one-half inch in length.

In the third embodiment of the invention mentioned above, fillers such as clays, e.g. ball clay, mica, silica, alumina and wood flour are used in addition to the organic or inorganic fibers.

Finally, suitable amounts of dyes and pigments can be used in the production of the composite board. These colorants are preferably water-soluble.

As described above, the composite molded product of this invention comprises the two, three, or four essential components described above. The molded composite product of this invention can be produced by the method to be described hereinafter which basically comprises the steps of mixing the components, molding the resulting mixture under pressure in a mold followed by curing of the "green" molded composition.

The composite molded product of this invention can be molded in various forms depending upon the desired end use, such forms including sheets, blocks, cubes, molding having various geometric configurations, molding whose surfaces have been embossed during the molding procedure, vaulted shapes and the like. More specifically, the composite molded product of this invention when produced in the form of a sheet has utility as thermally insulating and acoustically insulating ceiling panels, wall panels and fire barriers, useful in the building and construction industry.

The properties of the composite board produced according to the method of the present invention are largely dependent upon the density and geometry of the board itself. In general, densities of the boards can range from about 0.7 to 1.3 pounds per board foot.

As described above, the composite molded product of this invention can be produced by the method of this invention which is described in detail below.

The method of producing the composite molded product of this invention comprises essentially a blending step for blending the components, a molding step for molding the mixture of the components into a desired form and a curing step in which the "green" molded product is cured.

In the first step of the process of this invention, the expanded perlite particles, the components of the metal-modified urea-melamine-formaldehyde resin and, optionally, the fibrous material with or without the filler, are simply mixed to form a uniform mixture thereof.

The mixing of the components can be by using conventional techniques such as using a twin shell blender. The mixing of the components is to an extent that the proportions of the essential materials, i.e., the expanded perlite particles, the components for the metal-modified urea-melamine-formaldehyde resin and, optionally the fibrous material with or without the filler if present, are such that the proportions recited above are achieved. The mixing of the components to produce the composite molded product of this invention is conducted for such a time that a uniform mixture of the components can be obtained. Mixing times of about 1 to 2 minutes have been found to be adequate, depending on the actual composition. Mixing times of over about 2 minutes are usually not necessary and are therefore superfluous.

A suitable temperature range for the mixing can be about room temperature, i.e., about 20° to 30° C.

Alternatively, the dry components can be pre-mixed together, followed by addition of the resin.

Once the uniform blend of the components as described above is obtained, this mixture can then be charged into a mold having the form and shape ultimately desired for the composite molded product.

Alternatively, the blend can be extruded to obtain shapes such as blocks and rods with somewhat higher density than that obtained in a mold.

Once the mixture of components discussed above has been placed in a mold, the composite mixture is then subjected to pressure in order to achieve compaction and the desired product form. A suitable pressure which can be employed in order to achieve the pressure-molding of the mixture of components to produce the composite molded product of this invention can range from about 125 to 200, preferably about 150 to 175 lb/in$^2$ (8.8 to 14.1 preferably 10.5 to 12.3 kg/cm$^2$). The function of the molding procedure in this step is to compact and form the ultimate shape of the composite molded product of this invention. Lower pressures may tend to lead to poor consolidation of the composite and a lower strength of the final board. Higher pressures may tend to lead to undesirably high densities with the accompanying loss in acoustical and thermal insulating properties.

The mold is preferably perforated to allow the escape of vapors such as water vapor.

A suitable temperature range which can be employed during the molding step can be from about 90 to 120, preferably 105° to 115° C. These temperature ranges tend to promote a clean release of the molded composite from the mold, particularly when complex surface textures or geometries are used in the mold. Further, the mold members used in the mold can have a configuration not only to provide the desired ultimate product formed, but also if desired, to emboss on the surface of the composite molded product a decorative design or to provide preferred surface characteristics to the composite molded product, thereby not only improving the superficial characteristics but also improving the physical and performance characteristics. For example, where the composite molded product is to be used in the form of a sheet as a ceiling panel, the surface of the composite molded product can be altered to improve the appearance and acoustical properties thereof.

If desired, the molding of this invention produced as described above can be subject to the curing step (iii) in the mold or can be removed as a "green" molding for subsequent curing outside the mold, with curing in the mold being preferred. The curing step in the method for producing the composite molded product of this invention is to achieve a further condensation and crosslinking of the metal-modified urea-melamine-formaldehyde resin. Suitable curing temperatures which can be employed range from about 65° to 95° C., preferably about 90° to 95° C.

Once the composite molded product has been cured, it possesses the desirable characteristics set forth above of the composite molded product of this invention.

As indicated above, dielectric heating of the mold together with through-convection drying through perforations in the mold result in a cured product.

Additionally, if desired, after the composite molded product of this invention has been produced, additional treatments, such as surface coating to improve various physical characteristics such as resistance to abrasion, surface toughness, scrubability and corrosion resistance can be applied thereto or alternatively, coatings or laminates can be applied thereto in order to modify or alter the superficial characteristics, e.g. color, of the composite molded product of this invention.

The following examples are given to illustrate the invention in greater detail without intending to limit the same. Unless otherwise indicated, all parts, percentages, ratios, and the like are by weight and further, all procedures were conducted at room temperature (about 20°–30° C.) and at atmospheric pressure unless otherwise indicated.

EXAMPLE 1

Composite molded products of this invention were prepared in accordance with the following procedures.

The perlite used had a bulk density of 3 pounds per cubic foot, was prepared from grade "CO" ore and was obtained from the Grefco Company. It was found to have the following size distribution:

| U.S. Standard Sieve No. | Retained (% by weight) |
| --- | --- |
| 30 | — |
| 50 | 5.1 |
| 70 | 31.1 |
| 100 | 29.9 |
| 200 | 27.9 |
| 325 | 4.6 |
| PAN | 1.3 |

Mixtures of the components were prepared by uniformly blending the components set forth in the table below to prepare composite molded products of this invention at two different resin levels.

TABLE 1

| Component | Sample 1 (g) | Sample 2 (g) |
|---|---|---|
| Perlite (3#CO) | 225 | 180 |
| Titanium Tetrachloride-Urea Resin Component (68% solids) | 46 | 74 |
| Formaldehyde-Urea-Melamine Resin Component (about 51% solids) | 89 | 140 |

The components and the amounts thereof employed in the titanium tetrachloride-urea resin components for Samples 1 and 2 above were as follows:

| Component | Sample 1 (g) | Sample 2 (g) |
|---|---|---|
| Titanium Tetrachloride | 5.5 | 8.9 |
| Urea | 21.1 | 33.8 |
| Water | 14.6 | 23.5 |
| Sodium Bicarbonate* | 4.8 | 7.9 |

*To adjust pH to about 1.2 to 1.5, preferably 1.3 to 1.4.

and the formaldehyde-urea-melamine resin components employed in Samples 1 and 2 above were as follows:

| Component | Sample 1 (g) | Sample 2 (g) |
|---|---|---|
| Formaldehyhde (37% aqueous solution) | 57.5 | 91.6 |
| Melaminer | 11.2 | 17.8 |
| Urea | 8.8 | 14.1 |
| KNO$_3$* | 7.1 | 11.3 |
| Methanol | 7.1 | 11.3 |

*An oxidant to maintain the +4 valence of Ti.

In producing Samples 1 and 2 above, the titanium tetrachloride-urea resin component was produced by initially mixing the urea, titanium tetrachloride and sodium bicarbonate with the water in the amounts set forth above and along with the formaldehyde-urea-melamine component prepared separately by mixing the formaldehyde, urea, melamine, methanol and the KNO$_3$ oxidant and the expanded perlite particles were continuously mixed for two minutes in a Twin Shell mixer and then charged into a mold.

The mixture contained in the mold was then passed into a molding zone where the material in the mold was compacted under a pressure of about 200 lb/in$^2$ (14 kg/cm$^2$) to form the mixture of components into a green composite molding. The green composite molding was then cured at a temperature of about 95° C. for about 30 seconds utilizing dielectric heating coupled with the passage of heated air over the composite, whereby residual water and formaldehyde were removed, the resin was set and the product was cured into the final composite molded product of the invention.

The form of the mold used was such that a flat board was obtained suitable for use as a panel. The composite molded product produced above when fabricated into a ceiling board had non-flammable properties, good strength, acoustical absorption properties, compression resistance, and sag resistance and dimensional stability under humid conditions. These properties are shown in the following table.

TABLE II

| | Sample 1 (25% resin) | Sample 2 (40% resin) |
|---|---|---|
| Density, in pounds per board foot | 1.0 | 1.0 |
| Modulus of Rupture, in pounds per square inch | 105 | 145 |
| Noise Reduction Coefficient | 0.45 | — |
| Flame Spread Rating | 5 | — |
| Fuel Contribution | 11 | — |
| Smoke | 18 | — |
| Linear Variation, in 30 to 87% relative humidity | 0.15% | — |

EXAMPLE 2

The procedures described in Example 1 above were repeated to produce a sample of the composite molded product of this invention utilizing in addition to the components set forth above in Example 1 a fibrous material as a reinforcement. The components employed in producing this sample were as follows and were employed in the amounts set forth in the table below.

TABLE III

| Component | Sample 3 |
|---|---|
| Perlite (3#CO) | 169 |
| Wood fiber (Silvacel, a trade name for a wood fiber product (produced by Weyerhaeuser) | 56 |
| Titanium Tetrachloride-Urea Resin Component* | 46 |
| Formaldehyde Melamine-Urea Resin Component** | 89 |

*As described for Sample 1 of Example 1.
**As described for Sample 1 of Example 1.

EXAMPLE 3

The procedures described in Example 1 above were repeated with the components as described below in Table IV.

TABLE IV

| Component | Weight | % of Total |
|---|---|---|
| Perlite (3#CO) | 140 grams | 54.7% |
| Wood fiber (mechanically defiberized aspen from Corcoran Timber) | 47 grams | 18.3% |
| TiCl$_4$ - urea component* | 38 grams | 27% |
| Urea-melamine-formaldehyde component** | 89 grams | |

*As described for Sample 1 of Example 1.
**As described for Sample 1 of Example 1.

The following results were obtained for the board formed according to this Example:

| Density | 0.8 pounds per board foot |
|---|---|
| Modulus of Rupture | 84 pounds per square inch |
| Noise Reduction Coefficient | 0.50 |

EXAMPLE 4

The procedures described in Example 1 above were repeated with the components as described below in Table V:

TABLE V

| Component | Weight | % of Total |
|---|---|---|
| Perlite (3#CO) | 487 grams | 51% |
| Wood fiber* | 163 grams | 17% |
| Clay, (M and D; a trade name) | 98 grams | 10% |
| TiCl$_4$ - urea component** | 234 grams | 22% |
| Urea-melamine-formaldehyde component*** | 134 grams | |

*As described for Example 3.
**As described for Sample 1 of Example 1.
***As described for Sample 1 of Example 1.

The following results were obtained for the board formed according to this Example:

| | |
|---|---|
| Density | 0.89 pounds per board foot |
| Modulus of Rupture | 67 pounds per square inch |
| Noise Reduction Coefficient | 0.60 |

While the invention has been described in detail and with respect to specific embodiments thereof, it will be apparent to one of skill in the art that various changes and modifications can be made therein without departing from the spirit and scope thereof.

What is claimed is:

1. A composite molded product comprising the pressure molded and cured product produced by the process comprising:
   (a) uniformly blending about 80 to about 60% by weight of expanded perlite particles with an aqueous solution of about 20 to 40% by weight of a thermosetting Group IVB metal-modified urea-melamine-formaldehyde resin to produce a composite mixture, whereafter said composite mixture is directly charged into a mold;
   (b) molding the composite mixture in said mold under a pressure of about 9 to 14 kg/cm$^2$ to produce a molding; and
   (c) curing the molding at a temperature of about 65° to 95° C. to produce the composite molded product to thereby thermoset the same.

2. The molded product of claim 1, wherein said metal-modified urea-melamine-formaldehyde resin is a titanium-modified urea-melamine-formaldehyde resin.

3. The molded product of claim 1, wherein the amount of said expanded perlite particles is about 75 to 80% by weight and the amount of said metal-modified urea-formaldehyde resin is about 20 to 25% by weight.

4. The molded product of claim 1, wherein said expanded perlite particles have a particle size ranging from about 0.15 to 4.0 mm.

5. A reinforced composite molded product comprising the pressure molded and cured product produced by the process comprising:
   (a) uniformly blending about 79 to 40% by weight of expanded perlite particles with an aqueous solution of about 20 to 40% by weight of a thermosetting Group IVB metal-modified urea-formaldehyde resin and about 1 to 20% by weight of a fibrous reinforcing material to produce a composite mixture, whereafter said composite mixture is directly charged into a mold;
   (b) molding the composite mixture in said mold under a pressure of about 9 to 14 kg/cm$^2$ to produce a molding; and
   (c) curing the molding at a temperature of about 65° to 95° C. to produce the composite molded product to thereby thermoset the same.

6. The reinforced composite molded product of claim 5, wherein said metal-modified urea-melamine-formaldehyde resin is a titanium-modified urea-melamine-formaldehyde resin.

7. The reinforced composite molded product of claim 5, wherein the amount of said expanded perlite particles is about 60 to 55% by weight, the amount of said metal-modified urea-formaldehyde resin is about 20 to 25% by weight and said reinforcing fiber is 15 to 20% by weight.

8. The reinforced composite molded product of claim 5, wherein said expanded perlite particles have a particle size ranging from 0.15 to 4.0 mm.

9. The reinforced composite molded product of claim 5, wherein the fibrous reinforcing material is an organic fibrous reinforcing material, an inorganic fibrous reinforcing material or a mixture thereof.

10. The reinforced composite molded product of claim 9, wherein the fibrous reinforcing material is fiberglass, newsprint fiber, wood fiber or polyester fiber.

11. A reinforced composite molded product comprising the pressure molded and cured product produced by the process comprising:
    (a) uniformly blending about 68 to 36% by weight of expanded perlite particles, an aqueous solution of about 17 to 36% by weight of a thermosetting Group IVB metal-modified urea-melamine formaldehyde resin, about 1 to 18% by weight of a fibrous reinforcing material and about 14 to 10% by weight of a filler material to produce a composite mixture, whereafter said composite mixture is directly charged into a mold;
    (b) molding the composite mixture in said mold under a pressure of about 9 to 14 kg/cm$^2$ to produce a molding; and
    (c) curing the molding at a temperature of about 65° to 95° C. to produce the composite molded product to thereby thermoset the same.

12. The reinforced composite molded product of claim 11, wherein said metal-modified urea-melamine-formaldehyde resin is a titanium-modified urea-melamine-formaldehyde resin.

13. The reinforced composite molded product of claim 11, wherein said expanded perlite particles have a particle size ranging from 0.15 to 4.0 mm.

14. The reinforced composite molded product of claim 11, wherein said filler material is selected from the group consisting of clay, mica, silica, alumina and wood flour.

15. A method for producing a composite molded product which comprises:
    (a) uniformly blending about 80 to 60% by weight of expanded perlite particles and an aqueous solution which provides about 20 to 40% by weight of a thermosetting Group IVB metal-modified urea-melamine-formaldehyde resin to produce a composite mixture, whereafter said composite mixture is directly charged into a mold;
    (b) molding the composite mixture in said mold under a pressure of about 9 to 14 kg/cm$^2$ to produce a molding; and
    (c) curing the molding at a temperature of about 65° to 95° C. to produce the composite molded product to thereby thermoset the same.

16. The method of claim 15, wherein said expanded perlite particles have a particle size ranging from about 0.15 to 4.0 mm.

17. The method of claim 15, wherein said metal-modified urea-melamine-formaldehyde resin is a titanium-modified urea-melamine-formaldehyde resin.

18. The method of claim 15, wherein during step (a) there is further uniformly blended a fibrous reinforcing material to produce said composite mixture.

19. The method of claim 18, wherein the fibrous reinforcing material is an organic fibrous reinforcing material, an inorganic fibrous reinforcing material or a mixture thereof.

20. The method of claim 19, wherein the fibrous reinforcing material is fiberglass, newsprint fiber, wood fiber or polyester fiber.

21. The method of claim 18, wherein said composite mixture further comprises a filler.

22. The method of claim 21, wherein said filler is selected from the group consisting of clay, mica, silica, alumina and wood flour.

* * * * *